April 9, 1957       M. A. PERRY       2,787,851
SERVICE INDICATORS
Filed April 4, 1955       2 Sheets-Sheet 1
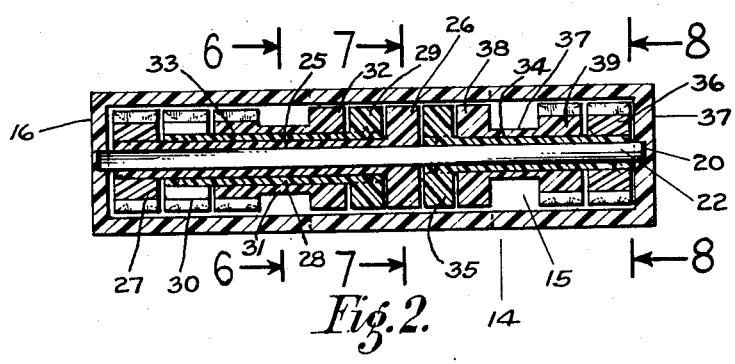
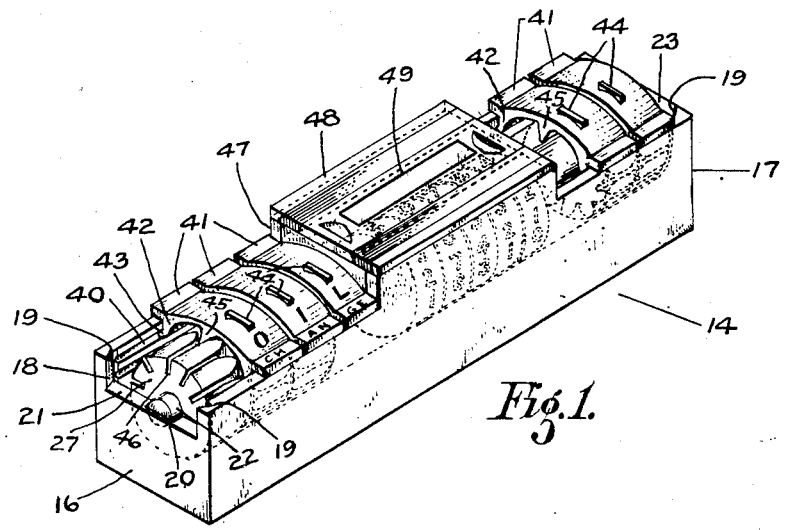
INVENTOR
Mayne A. Perry
BY
Edward C. Healy
ATTORNEY April 9, 1957  M. A. PERRY  2,787,851
SERVICE INDICATORS Filed April 4, 1955  2 Sheets-Sheet 2

INVENTOR
Mayne A. Perry
BY Edward C. Healy
ATTORNEY

United States Patent Office 2,787,851
Patented Apr. 9, 1957

2,787,851

SERVICE INDICATORS

Mayne A. Perry, San Francisco, Calif.

Application April 4, 1955, Serial No. 499,113

2 Claims. (Cl. 40—68)

This invention relates to indicating devices and has particular reference to a mileage indicator adapted to be associated with a motor vehicle for indicating the mileage in the oil used by the vehicle in the course of its travel for a definite distance.

The principal object of the invention is the production of a portable device preferably made of a plastic material and which can be readily attached at a location preferably adjacent to the driver's seat where the positioning of the indicator will be most convenient for reading by an occupant of the motor vehicle.

A further object of the invention is the production of a device of the character described that is manually actuated to be set at a pre-determined figure or reading for indicating when a change of oil is necessary when the "speedometer" of a car shows a similar reading.

An additional object of the invention is the production of a service and particularly a mileage oil indicating device that is simple in construction, economical to manufacture, compact in arrangement, light in weight and yet strong and durable, and highly efficient and serviceable in use.

Other objects and advantages will be apparent during the course of the following description.

Figure 3:
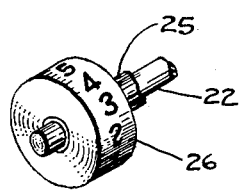
Figure 4:
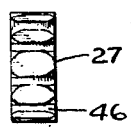
Figure 5:
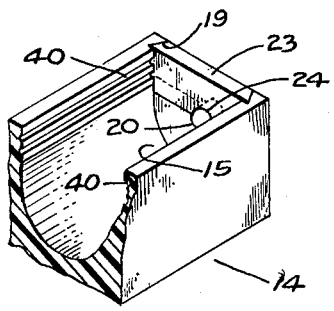
Figure 6:
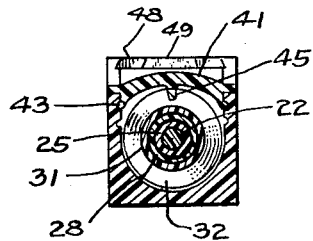
Figure 7:
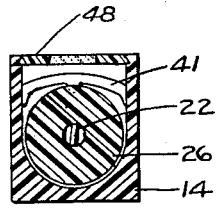
Figure 8:
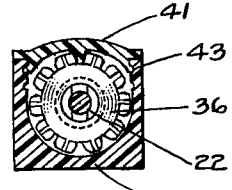
Figure 9:
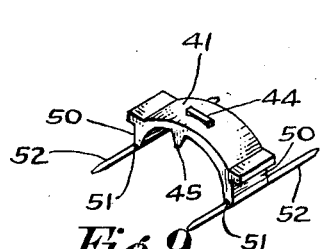
Figure 10:
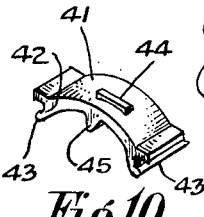
Figures 11, 12:
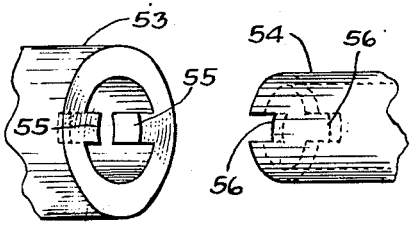

In the accompanying drawing forming a part of the specification and in which like numerals are employed to designate like parts throughout the same, Fig. 1 is a perspective view of the device constructed in accordance with my invention, Fig. 2 is a horizontal sectional view through the same, the view being taken on the line of the shaft axis, Fig. 3 is a perspective view of one of the discs of the gauge with suitable numbers displayed thereon, Fig. 4 is an edge view of one of the revolvable number controls, Fig. 5 is an enlarged fragmentary perspective view disclosing to advantage the curved configuration of the closed in portion which holds the contents into the casing and also secures the shaft, Fig. 6 is a transverse vertical section on the line 6—6 of Fig. 2, Fig. 7 is a similar section on the line 7—7 of Fig. 2, Fig. 8 is a transverse vertical section on the line 8—8 of Fig. 2 and looking in the direction of the arrows, Fig. 9 is a perspective view of a modified form of a slidable locking element which holds the indicating numbers in place after the same have been set, Fig. 10 is a perspective view of one of the locking members that is adapted to slide in the top groove, Fig. 11 is a fragmentary perspective view of a modified form of means for securing either of the tubes together, and Fig. 12 is a fragmentary side elevational view of a tongue and groove method utilized in a modified form of the invention.

Referring in detail to the drawings and numerals thereof, wherein for the purpose of illustration like numerals designate like parts throughout the same, the numeral 14 designates, as a whole an elongated casing in which the various parts embodying the invention are mounted and is preferably made of plastic and constructed rectangular in shape with the top portion open, as at 15, and formed with closed end walls 16 and 17 as disclosed to advantage in Figs. 1, 2 and 5. The said end walls are rectangularly recessed as at 18, and formed with oppositely disposed vertical angularly shaped grooves 19 in the side portions thereof and with a substantially semi-circular opening 20 in the bottom portion 21 and into which semi-circular opening, an elongated horizontal shaft 22 is mounted and tightly fits therein. Suitable upper end walls 23, semi-circularly recessed as at 24, are slidably positioned in the said vertical grooves 19 and are positioned in the said recesses 18 and over the said shaft opening 20 and tightly fit on the shaft 22.

In Fig. 2 there is shown a sleeve 25 revolvably mounted on the left end portion of the said shaft 22, which sleeve carries a numerated rotor or indicator wheel 26 on one end portion thereof and is formed with grooved disc or manipulating wheel 27 on the opposite end portion. The said rotor can be a separate part fixed on the sleeve and likewise the disc, or can be made in any manner to facilitate assembling. The numeral 28 designates a second sleeve carrying a numerated rotor or indicator wheel 29 on one extremity thereof and a grooved or notched disc or manipulating wheel 30 on the opposite end, which second sleeve is revolvably supported on the first sleeve, and likewise, a third sleeve 31, having a fixed numerated rotor or indicator wheel 32 and a notched disc or manipulating wheel 33, is revolvably mounted on the said second sleeve. On the right end portion of the shaft, a sleeve 34 is revolvably mounted thereon and has a numerated rotor or indicator wheel 35 and a notched disc or manipulating wheel 36 spaced one from the other and fixed on opposite end portions thereof, and a second sleeve 37 on said right and having a numerated rotor or indicator wheel 38 and a notched disc or manipulating wheel 39 is revolvably mounted on the sleeve 34.

In Fig. 1 there is disclosed the preferred form of construction utilized for convering the various numerated rotors, indicator wheels and notched discs manipulating wheels. The casing 14 is longitudinally grooved in each side wall thereof, as at 40, and a series of covers 41 are provided and each formed with a downwardly reduced portion 42 that flares outwardly as at 43 and slidably extends in the grooves 40 provided in the side walls of the casing. Each cover is provided with a handle 44 to facilitate the sliding or otherwise removing of the same and is formed with a downwardly extending key 45 that fits into slots 46 formed in the periphery of the discs manipulating wheels, on the various sleeves, whereby the numerated rotors indicator wheels are locked and prevented from accidental displacement. The indications or indicia are on the outer periphery of each of said indicating wheels and the notches or grooves are on the outer periphery of each manipulating wheel.

The portion of the casing 14 in which the numerated rotors are positioned is made higher as disclosed at 47 in Fig. 1, and a cover 48 is slidably positioned thereon, the said cover being preferably constructed of transparent plastic and has a window or central marked portion 49 to designate the total figure indicated by the rotors when they are adjusted to the desired position, which total figure indicates to the driver the time to change oil when the mileage shown on the speedometer checks with the same. It will be apparent the numbers can be readily changed by turning the respective manipulating wheels individually as needed to indicate the figure representing the mileage reading for oil change or the like.

The form of cover shown in Fig. 9 is identical to that illustrated in Fig. 10, with the exception of being provided with two spaced legs 50 that vertically extend downwardly and are formed concave on the bottom extremities thereof as at 51, and are supported on two round rods 52 that are capable of being fixed to the side walls of the casing 14. In Figs. 11 and 12 the sleeves 53 and 54 are provided with oppositely disposed keys and keyways 55 and 56 respectively, and illustrate the manner by which sleeves can be locked, one to the other, if desired. In this instance the element 55 will be positioned in the groove 20.

This indicating device is not limited to its use for measuring oil utilized in vehicles but the same principle of the invention can be employed by making an unlimited number of the devices for checking spark plugs, etc.

It is to be understood that the form of my invention herewith shown and described is to be taken as a preferred example of the same and that various changes relative to the shape, size, material and arrangement of parts may be resorted to without departing from the spirit or scope of the subjoined claims.

Having thus described my invention, I claim:

1. In a service indicator, an elongated casing having a bottom, longitudinal sides and end walls, a journal shaft extended within the length of said casing and having its ends supported in said end walls, a plurality of concentric telescopic sleeves of graduated length on said shaft within said casing, the longest sleeve being positioned directly on the shaft and the shortest sleeve being the outermost of the telescoped sleeves, an indicator wheel bearing peripheral indicia on an end of the longest sleeve, a manipulating wheel on the other end of said longest sleeve, an indicia bearing wheel on each of the other sleeves between the ends of said longest sleeve and being adjacent to the next previous indicia bearing wheel and inward from said indicia bearing wheel of said longest sleeve, a manipulating wheel on each sleeve between the ends of said longest sleeve inwardly adjacent to the next previous manipulating wheel, and a manually releasable individual locking element for each manipulating wheel.

2. In a service indicator, an elongated casing, a relatively fixed cover over a portion of said casing, a series of indicator wheels individually rotatable in the casing under said cover, each indicator wheel having a series of indicia on its outer periphery, said cover being adapted to permit observing the indicia aligned thereunder; a series of manipulating wheels rotatably held in the casing outside of said portion under said cover, a tubular sleeve connecting each manipulating wheel to one indicator wheel, the respective sleeves being so telescoped as to permit selective individual manipulation of said indicator wheels, a journal shaft held longitudinally in said casing and being extended through said sleeves and wheels to journal the same; each manipulating wheel having peripheral transverse notches, an individual cover for each manipulating wheel, means to hold each individual cover longitudinally slidably on said casing so as to permit the sliding of each individual cover onto or off its manipulating wheel, and a locking ridge on the underside of each individual cover slidable endwise into an aligned notch of its manipulating wheel to lock the latter in an adjusted position.

References Cited in the file of this patent

UNITED STATES PATENTS

| | | |
|---|---|---|
| 391,919 | Rosewell et al. | Oct. 30, 1888 |
| 457,204 | Klauser | Aug. 4, 1891 |
| 1,124,100 | Baker et al. | Jan. 5, 1915 |
| 1,720,085 | Meyers | July 9, 1929 |
| 2,021,236 | Greattinger et al. | Nov. 19, 1935 |
| 2,585,420 | Ailes | Feb. 19, 1952 |

FOREIGN PATENTS

| | | |
|---|---|---|
| 467,566 | Italy | Dec. 11, 1951 |